United States Patent [19]

Long et al.

[11] Patent Number: 5,092,255

[45] Date of Patent: Mar. 3, 1992

[54] SEED BOOT EXTENSION

[75] Inventors: John D. Long, Ankeny; Richard W. Hook, West Des Moines, both of Iowa

[73] Assignee: Deere & Company, Moline, Ill.

[21] Appl. No.: 644,143

[22] Filed: Jan. 22, 1991

[51] Int. Cl.[5] ............................................. A01C 5/06
[52] U.S. Cl. ................................... 111/167; 111/170; 111/197
[58] Field of Search ............... 111/154, 155, 149, 157, 111/163, 167, 168, 170, 190, 197

[56] References Cited

U.S. PATENT DOCUMENTS

| | | | |
|---|---|---|---|
| 221,004 | 10/1879 | Strayer | 111/190 |
| 252,265 | 1/1882 | Scofield | 111/197 |
| 410,438 | 9/1889 | Patric et al. | 111/197 X |
| 889,947 | 6/1908 | Miller | 111/197 X |
| 909,137 | 1/1909 | Bellerive | 111/190 |
| 2,533,374 | 12/1950 | Hyland | |
| 4,253,412 | 3/1981 | Hogenson | |
| 4,616,581 | 10/1986 | Brothers | |
| 4,674,419 | 6/1987 | Kopecky | |
| 4,760,806 | 8/1988 | Bigbee et al. | |

FOREIGN PATENT DOCUMENTS

| | | | |
|---|---|---|---|
| 3111479 | 10/1982 | Fed. Rep. of Germany | 111/197 |
| 3441610 | 5/1986 | Fed. Rep. of Germany | 111/197 |

*Primary Examiner*—David H. Corbin
*Assistant Examiner*—Jeffrey L. Thompson

[57] ABSTRACT

A flexible seed boot extension fabricated from an ultra-high molecular polyethylene sheet and releasably held in position by a slot and retaining lug so that seed bounce and soil coverage variations are reduced while desired seed flow from the boot to the furrow is unrestricted. The length of the extension is sufficient to prevent seed from bouncing out of the furrow and yet short enough that normal press wheel operation remains unimpeded. The extension, which is constantly in contact with the soil, and is flexible and smooth to easily ride over objects and resist breakage soil build-up.

14 Claims, 2 Drawing Sheets

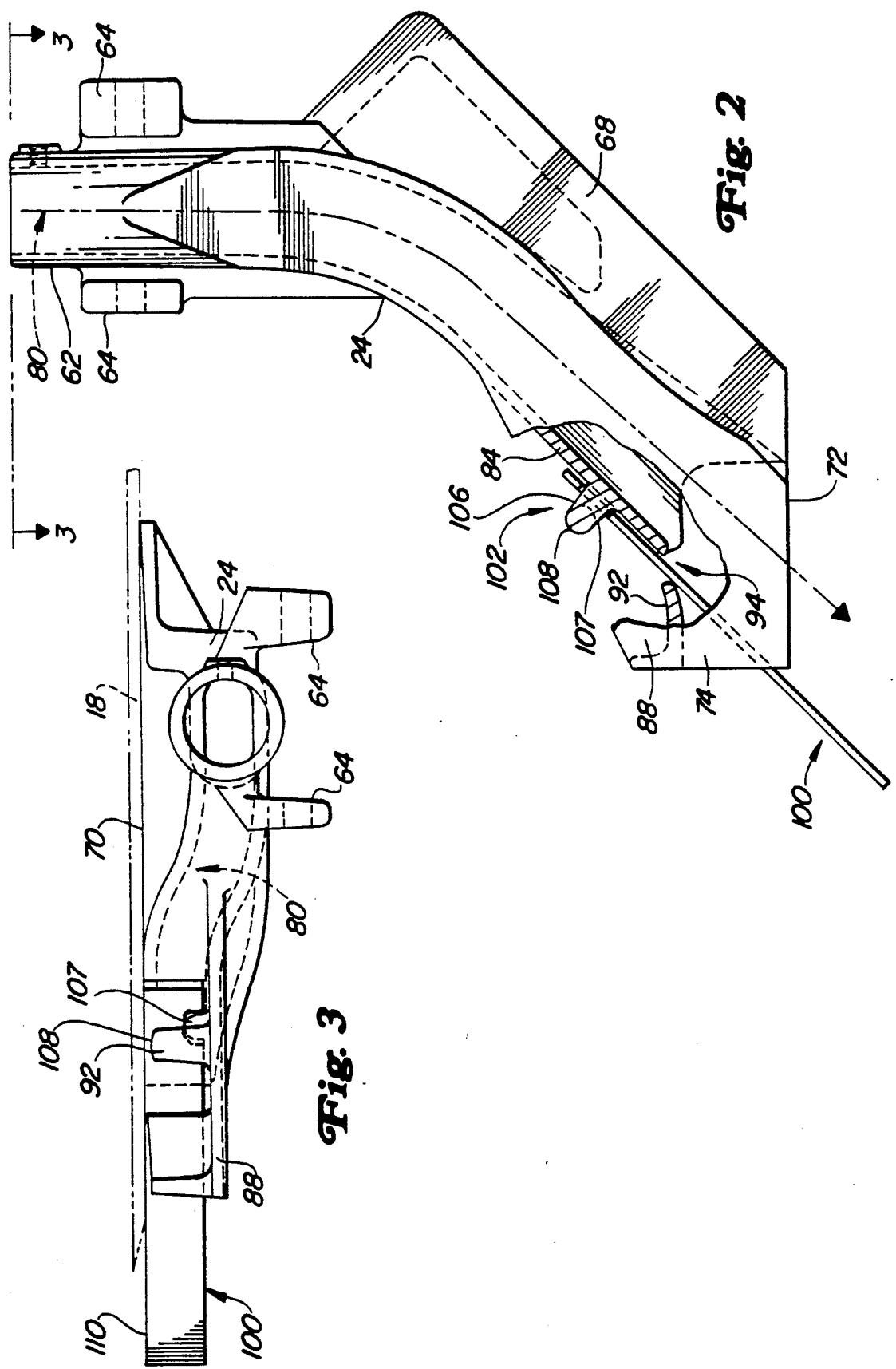

SEED BOOT EXTENSION

BACKGROUND OF THE INVENTION

1) Field of the Invention

The present invention relates generally to seeding implements and more specifically to an attachment for a furrow opener which improves seed placement.

2) Related Art

Proper seed placement by the furrow openers on grain drills and planters is critical for achieving uniform crop emergence. The seeds must be dropped into the prepared furrow at a constant depth and covered with a uniform layer of soil. With modern high speed planting, achieving uniform seed depth has been a continuing problem because of seed bounce and soil flow into the area of seed drop.

Various devices have been employed to reduce seed bounce including special seed tubes designed to achieve a rearward seed velocity equal to the forward speed of the implement. Some seed tubes include deflectors or baffles to reduce seed bounce in the furrow. Although providing some improvement in uniform crop emergence, these devices often are ineffective to alleviate the problem of soil flow back into the furrow. Some devices can restrict normal seed flow or interfere with press wheel operation, particularly when the press wheel closely trails the furrow opener such as is common in minimum tillage, high residue operations.

BRIEF SUMMARY OF THE INVENTION

It is therefore an object of the present invention to provide an improved device for a furrow opener which reduces seed bounce, particularly in high speed planting operations. It is a further object to provide such a device which helps to assure more uniform soil coverage of the seeds deposited in the furrow by the opener.

It is still a further object of the invention to provide a device for improving both seed depth control and covering in a furrow opener. It is another object to provide such a device which does not restrict the normal, desired flow of seed from the seed boot to the furrow and which does not interfere with trailing press wheel operation.

It is another object of the invention to provide a furrow opener device for restricting seed bounce in the furrow, wherein the device is low in cost, easy to manufacture, wear and breakage resistant, flexible and resistant to soil build-up. It is yet another object to provide such a device which may be quickly and easily replaced.

It is a further object of the invention to provide a seed boot extension, particularly useful with an angled single disk opener arrangement, for extending the length of the seed path in the shadow of the disk (that is, behind the disk as the opener is viewed from the front) to reduce seed bounce and seed coverage variations, even in high speed, high residue seeding operations.

A flexible seed boot extension constructed according to the teachings of the present invention is fabricated from an ultra-high molecular polyethylene sheet and is held in position within the boot at the back side of the seed tube by a slot and retaining lug so that desired seed flow from the boot to the furrow is unrestricted. Additional mounting hardware is eliminated to lower costs and reduce assembly and repair time. The length of the extension is sufficient to prevent seed from bouncing out of the furrow and yet short enough that normal press wheel operation remains unimpeded. The extension, which is constantly in contact with the soil, is flexible and smooth to easily ride over objects and resist soil build-up. The device resists breakage and wear and can be easily and quickly replaced if necessary.

The extension lies closely adjacent to the lower rear quadrant of the angled disk of a single disk opener and increases the effective length of the seed tube to guide the seeds to the bottom of the furrow with minimum bounce and minimum coverage variations in high speed, high residue conditions. The press wheel runs very close to where seed action stops and consistently firms close to the tip of the extension for good soil-seed contact.

These and other objects, features and advantages of the present invention will become apparent to one skilled in the art upon reading the following detailed description in view of the drawings.

BRIEF DESCRIPTION OF THE DRAWINGS

FIG. 2 is an enlarged side view of the lower portion of the seed boot of opener assembly.

FIG. 3 is a top view of the seed boot of FIG. 2 taken essentially along lines 3—3 of FIG. 2.

DETAILED DESCRIPTION OF THE DRAWINGS

Figure 1:
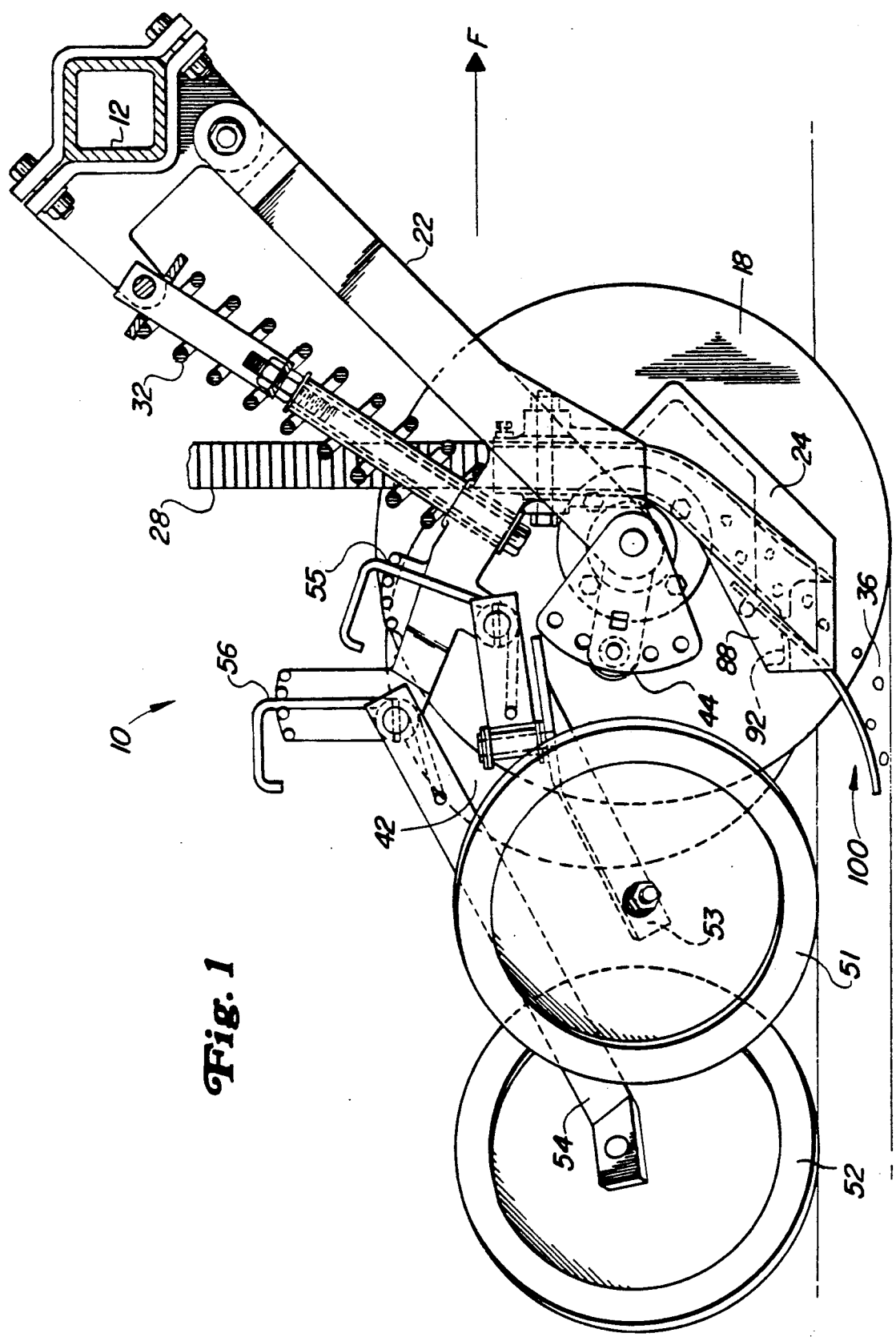
FIG. 1 is a side view of a furrow opener assembly with the extension of the present invention attached thereto and showing the action of the extension to reduce seed bounce and soil coverage variations.

Referring now to FIG. 1, therein is shown a furrow opener assembly 10 supported from a frame member 12 of a grain drill or similar seeding implement adapted for forward movement F over a field. As shown in FIG. 1, the general construction of the furrow opener assembly 10 is of the type shown and described in U.S. Pat. No. 4,760,806 and includes an angled opener disk 18 supported from a drawbar 22 for rotation about an axis angled from the transverse direction. A seed boot 24 is supported closely adjacent the disk 18 in the shadow of the leading edge of the disk and is connected to a metered source of seeds (not shown) on the implement through a flexible seed tube 28. The seed boot 24 preferably is biased against the side of the disk 18.

A down-pressure spring assembly 32 biases the opener disk 18 into the soil to open a furrow, indicated at 36. A depth adjustment wheel 42 is supported for rotation adjacent the leading side of the disk 18 about an axis offset from the axis of the disk. Furrow depth is controlled with an adjustment mechanism 44 which moves the axis of the wheel 42 vertically with respect to the disk 18.

Firming and closing wheels 51 and 52 are supported rearwardly adjacent the disk 18 from arms 53 and 54, respectively, for firming the soil to provide good seed-soil contact in the furrow and for crushing the side of the furrow to provide a loose layer of soil over the seeds. Firming and closing wheel force may be adjusted by down-pressure spring assemblies 55 and 56.

The seed boot 24 (FIGS. 3 and 4) is preferably cast as unitary structure and includes an upper portion 62 with a bracket 64 pivotally connected to the drawbar 24 and extending downwardly therefrom to a wedge-shaped portion 68 with a flat disk-side face 70 (FIG. 3) which is biased into contact with the trailing side of the disk 18. The portion 68 terminates in a lower horizontal edge 72 and a rear vertical edge 74. A seed path 80 defined by the seed boot 24 extends downwardly and rearwardly around the hub of the disk 18 and terminates adjacent the lower edge 72 above the lower extremity of the disk (FIG. 1). A rear wall 84 (FIG. 2) defines the aft boundary of the seed path 80 and terminates above the edge 72 and forwardly of the edge 74. An outer wall 88 opposite the disk-side of the portion 68 projects upwardly and rearwardly relative to the rear wall 84, and a ledge or retaining portion 92 projects toward the disk 18 from the wall 88. The ledge 92 defines with the bottom edge of the wall 84 a narrow, transversely extending slot or opening 94.

A flexible strap or extension 100 is secured to the seed boot 24 and defines an extended rear boundary for the seed path 80 which curves downwardly and rearwardly from the ledge 92 during planting (FIG. 1). Securing structure 102 for releasably supporting the strap 100 to the seed boot 24 independently of separate fasteners includes mating securing portions on the strap and the seed boot. As shown in FIGS. 2 and 3, a lug or projection 106 extending upwardly and rearwardly from the back wall 84 above the slot 94. A mating strap notch 107 is provided which extends inwardly from the side edge of the strap 100 near the upper end of the strap. The strap 100 is positioned in the slot 94 and the notched end is moved laterally against the lug 106. The lug 106 includes an upper transverse extension 108 which projects toward the disk over the upper end of the positioned strap 100 to hold the strap on the lower aft portion of the seed boot 24. The inner or disk-side edge 110 of the strap 100 is in contact with the side of the disk 18, and the lower, aft portion of the strap extends downwardly and flexes rearwardly (FIG. 1) below the retaining portion 92. The aft portion of the strap projects into the furrow above the seeds to effectively extend the length of the seed path which guides the seeds into the furrow 36 so that seed bounce is minimized. The strap 100 also prevents dirt from the furrow boundaries from collapsing or falling into the furrow before the seeds come to rest at the bottom of the furrow.

Preferably the strap 100 is smooth and continuous with a width approximately equal to the width of the seed path in the seed boot 24. The strap is fabricated from an ultra-high molecular weight polyethylene sheet for low cost, ease of manufacture and good wear resistance and flexibility.

To replace a strap 100, the operator removes the old strap by pulling the boot 24 away from the disk 18 against the bias to facilitate sliding of the strap 100 laterally from the slot 94. A new strap 100 is positioned within the slot 94, and the slot 107 at the upper end is simply moved over the lug 106. The boot 24 is released, and the bias moves the boot against the disk to trap the strap 100 in position. The lug extension 108 limits fore-and-aft movement of the upper end of the strap 100.

Having described the preferred embodiment, it will become apparent that various modifications can be made without departing from the scope of the invention as defined in the accompanying claims.

We claim:

1. In an opener assembly adapted for forward movement through the soil and having a seed boot with a seed path for directing seeds downwardly and rearwardly into a furrow, structure for preventing bouncing of the seeds in the furrow as the seeds are directed therein, comprising:
    a flexible strap with first and second ends; and
    means for supporting the first end of the strap from the seed boot adjacent the seed path with the second end extending downwardly and rearwardly therefrom into the furrow above the seeds which are directed into the furrow; and
    wherein the means for supporting the first end includes means for releasably securing the strap to the seed boot independently of separate fasteners.

2. The invention as set forth in claim 1 wherein the means for releasably securing the first end includes mating securing portions located on the strap and the seed boot.

3. The invention, as set forth in claim 1 wherein the means for releasably securing includes a projection located on the seed boot, and a mating notch in the strap adapted for receipt over the projection.

4. The invention as set forth in claim 3 wherein the seed boot includes a transversely extending retaining portion rearwardly of the strap, and rearwardly and below the projection so that the strap flexes rearwardly with respect to the retaining portion as the opener assembly moves forwardly through the soil.

5. In an opener assembly adapted for forward movement through the soil and having a seed boot with a seed path for directing seeds downwardly and rearwardly into a furrow, and structure for covering the seeds in the furrow with a layer of soil, structure for preventing bouncing of the seeds in the furrow as the seeds are directed therein, comprising:
    a flexible, continuous narrow strip of material with leading and trailing ends; and
    means for supporting the leading end of the strip from the seed boot adjacent the lower, aft portion of the seed path with the trailing end extending downwardly and flexing rearwardly into the furrow above the seeds which are directed into the furrow and below the top surface of the layer of soil.

6. The invention as set forth in claim 5 wherein the means for supporting the forward end includes means for releasably securing the strip relative to the seed boot independently of separate fasteners.

7. The invention as set forth in claim 6 wherein the means for releasably securing the forward end includes mating securing portions located on the strip and the seed boot.

8. The invention as set forth in claim 6 wherein the means for releasably securing independently of separate fasteners includes a seed boot projection and a mating notch in the strip adapted for receipt by the projection.

9. The invention as set forth in claim 8 wherein the seed boot includes a transversely extending portion rearwardly of the strip, and rearwardly and below the projection so that the strip flexes rearwardly with respect to the retaining portion into the furrow as the opener assembly moves forwardly through the soil.

10. The invention as set forth in claim 5 wherein the strip is smooth and continuous, and substantially forms a curved continuation of the seed path downwardly into the furrow below the seed boot to prevent dirt from entering the furrow until the seed comes to rest at the bottom of the furrow.

11. In an opener assembly with an angled single disk opener adapted for forward movement through the soil and having an upright seed boot adjacent the disk with a seed path terminating above the lower extremity of the disk for directing seeds into a furrow formed by the disk, structure for preventing bouncing of the seeds in the furrow as the seeds are directed therein, comprising:

a flexible, continuous narrow strip of material with side edges and leading and trailing ends; and means for supporting the leading end of the strip adjacent the lower end of the seed boot with one of the edges extending along one side of the disk, a substantial portion of the strip when viewed from a direction transverse to the forward direction lying within the outer circumference of the disk, and with the trailing end extending downwardly and flexing rearwardly into the furrow above the seeds directed into the furrow.

12. The invention as set forth in claim 11 wherein the one of the edges of the strip is in contact with the one side of the disk.

13. In an opener assembly with an angled single disk opener adapted for forward movement through the soil and having an upright seed boot adjacent the disk with a seed path terminating above the lower extremity of the disk for directing seeds into a furrow formed by the disk, structure for preventing bouncing of the seeds in the furrow as the seeds are directed therein, comprising:

a flexible, narrow strip of material with side edges and leading and trailing ends; and means for supporting the leading end of the strip adjacent the lower end of the seed boot with one of the edges in contact with one side of the disk and with the trailing end extending downwardly and flexing rearwardly into the furrow above the seeds directed into the furrow.

14. The invention as set forth in claim 13 wherein the leading end of the strip is supported between the central portion of the disk and the lower rear edge of the disk and the trailing end extends rearwardly of the lower edge of the disk.

* * * * *